United States Patent [19]

Hale

[11] Patent Number: 4,558,975

[45] Date of Patent: * Dec. 17, 1985

[54] DRILL WITH DISPOSABLE INSERTS

[75] Inventor: Alan A. Hale, Berkhamsted, England

[73] Assignee: General Electric Company, Detroit, Mich.

[ * ] Notice: The portion of the term of this patent subsequent to Oct. 9, 2001 has been disclaimed.

[21] Appl. No.: 423,500

[22] Filed: Sep. 27, 1982

[30] Foreign Application Priority Data

Feb. 26, 1982 [GB] United Kingdom ................. 8205689

[51] Int. Cl.$^4$ ............................................. B23B 51/00
[52] U.S. Cl. .................................... 408/186; 407/113; 408/223; 408/713
[58] Field of Search .................... 408/199, 239 R, 186, 408/713, 223, 52; 407/113, 114, 103, 101

[56] References Cited

U.S. PATENT DOCUMENTS

| | | | |
|---|---|---|---|
| 3,187,406 | 6/1965 | Franko | 407/114 |
| 3,271,842 | 9/1966 | Breuning | 407/103 X |
| 3,381,349 | 5/1968 | Mewcomer | 407/101 X |
| 3,802,041 | 4/1974 | Swann | 407/113 |
| 3,878,905 | 4/1975 | Schaumann | 408/713 |
| 4,105,357 | 8/1978 | Kehl | 408/188 X |
| 4,124,328 | 11/1978 | Hopkins | 408/199 X |
| 4,149,821 | 4/1979 | Faber | 408/705 X |
| 4,215,957 | 7/1980 | Holma et al. | 407/114 |
| 4,220,429 | 9/1980 | Powers et al. | 408/224 |
| 4,230,429 | 10/1980 | Eckle | 408/186 |
| 4,268,198 | 5/1981 | Peters | 408/713 X |
| 4,359,300 | 11/1982 | Hazra et al. | 407/114 |

FOREIGN PATENT DOCUMENTS

| | | | |
|---|---|---|---|
| 2161286 | 6/1973 | Fed. Rep. of Germany | 407/114 |
| 456904 | 10/1966 | Japan | 407/42 |
| 1200127 | 7/1970 | United Kingdom | 408/52 |
| 1359238 | 7/1974 | United Kingdom | 407/114 |

Primary Examiner—William R. Briggs
Assistant Examiner—Glenn L. Webb
Attorney, Agent, or Firm—A. E. Bahr; E. F. Chapman; J. J. Lichiello

[57] ABSTRACT

The present invention provides a drilling tool having a shank and at least one pair of identical cutting inserts, the inserts having an octagonal shape having alternate equal obtuse angles. Each of the inserts is arranged such that they each have a different radial displacement from the turning axis of the drill, the inner insert having a cutting path which overlaps the turning axis of the drill and the next outer insert having a cutting path which overlaps the cutting path of the inner insert. The cutting path of each insert is formed by the cutting edges either side of the obtuse angles of the insert.

5 Claims, 4 Drawing Figures

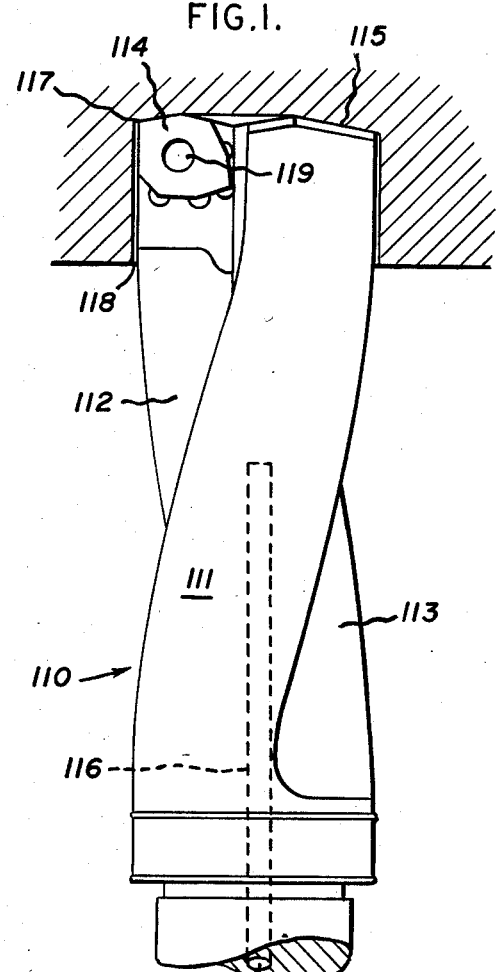
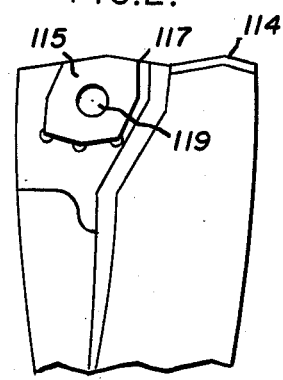
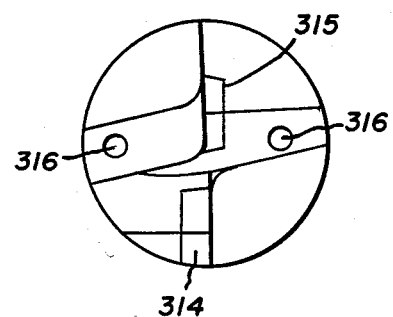
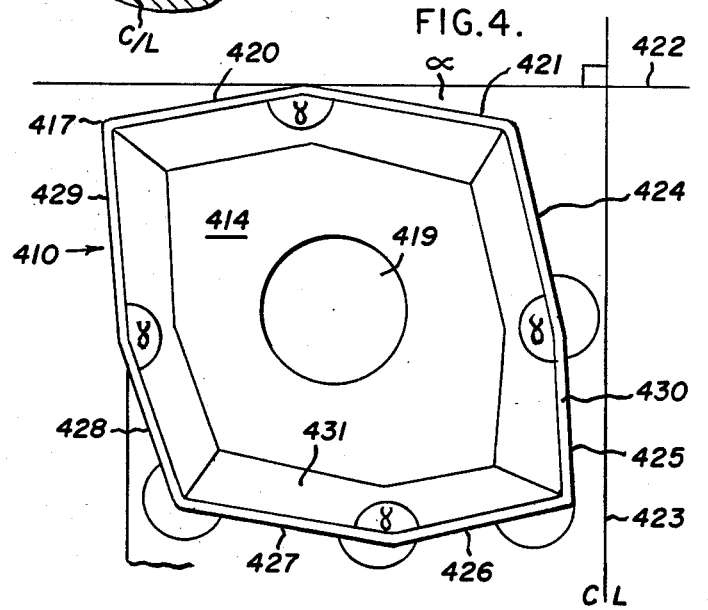

DRILL WITH DISPOSABLE INSERTS

CROSS REFERENCE TO RELATED PATENT APPLICATION

This patent application is related to Applicant's copending U.S. patent application Ser. No. 449,066 filed Dec. 13, 1982 also assigned to the instant assignee.

The present invention is concerned with drills having disposable inserts. In particular, the disposable inserts used with the drill are octagonal inserts.

Drilling tools with disposable inserts are well-known. U.S. Pat. No. 1,546,981 describes a drill having a shank with two axially extending chip recesses or flutes and inserts positioned such that the cutting edges produce the resulting hole. The inserts are positioned with a radial location such that the inner insert sweeps a radius including the turning axis of the drill, and the outer insert sweeps a radius overlapping that of the inner insert. FIG. 12 of that patent specification shows that hexagonal inserts can be used. The problem with such a drill is that forces on each of the inserts are unequal because of their differing radial distance from the turning axis of the drill. This problem is partly overcome by altering the radial location of the inner insert away from the peripheral insert by a sufficient amount to balance the forces.

U.S. Pat. No. 2000704 describes a drilling or boring tool which may have one or more hexagonal inserts. When a plurality of inserts are used, the inserts are arranged at equal angular radial spacings relative to the turning axis of the drill. In addition, the hexagonal insert has two cutting edges which make substantially equal angles with a line parallel to the turning axis of the drill. In such a drill, when the cutting edges are viewed longitudinally, the outer insert presents an acute angle at the outer cutting point. During rotation this cutting point can be easily damaged.

The present invention provides a drilling tool having a shank and plurality of cutting inserts, the inserts having two parallel octagonal side faces and contiguous edge faces of equal length, the octagonal side faces having alternate equal obtuse angles and cutting edges formed at the junction of at least one of the side faces and each of the edge faces, the inserts being arranged such that each has a different radial displacement from the turning axis of the drill, the inner insert having a cutting path which overlaps the turning axis of the drill and each next radially outer insert having a cutting path which overlaps the cutting path of the next inner insert, the cutting path of each insert being formed by the cutting edges either side of one of the equal obtuse angles of the insert.

The present invention maintains the equal radial spacing of the cutting inserts when viewed axially such that swarf removal from each of the inserts does not become an obstruction for the insert which is radially displaced from the other. The radial symmetry of the present invention is therefore through to be an advantage.

It is preferred that each of the inserts on the drill is exactly similar in size and geometry. The approach angle of each cutting edge is also preferably the same. The approach angle is defined as the angle each cutting angle makes with a line extending perpendicular to the turning axis of the drill. As each insert has two cutting edges when the drill is turning the approach angle of each of these cutting edges are defined as $\alpha$ and $\beta$ respectively. The angle $\gamma$ defining the obtuse angle may vary from 120° to 170° and is preferably 160°. When positioned in the shank, the $\alpha - \beta$ may vary up to 8°. Preferably the angles are the same or can vary by a small amount i.e. up to 8°. If angle $\beta$ is considered to be the approach angle radially further away from a turning axis of the drill then the value of $\beta$ can be less than the value of $\alpha$ or vice versa. In one embodiment, the angle $\beta$ is the range 78° to 79° and angle $\alpha$ is the range 81° to 82°, preferably 78°30' and 81°30I respectively. All the angles may have a tolerance of ±30'.

The preferred drill arrangement of the present invention is one which there are a single pair of octagonal cutting inserts arranged with their cutting edges along a diameter of the drilling tool.

The present invention will be further described by way of example only, with reference to the accompanying drawings, in which:

FIG. 1 is a side view of the drill of the present invention;

FIG. 2 is a further side view of the drill of FIG. 1 rotated through 180°;

FIG. 3 is an axial end view of the drill shown in FIG. 1; and

FIG. 4 is an enlarged view of the insert of the present invention as shown in FIG. 1.

Referring to FIGS. 1 and 2, a drill 110 has a shank 111 with drill flutes 112 and 113 extending to a pair of cutting inserts 114,115. The inserts 114, 115 are of the type having eight sides with four pairs of alternate obtuse angles. Particularly useful in the present invention are the octagonal inserts described in our copending patent application filed on the same data as this application. The centre of the drill shank has a cooling channel 116 passing therethrough, which subdivides to supply coolant or cutting fluid to each of the inserts. FIG. 3 shows an axial end view of the drill. The inserts 314 and 315 correspond to the inserts 114 and 115 of the FIGS. 1 and 2, cutting fluid passes to the inserts from cooling channels 316. The arrangement of the inserts in relation to the axis is such that the cutting edges of each insert are disposed along a diameter of the drill. Insert 114 has a cutting corner 117 which, as shown in FIG. 1, extends beyond the diameter of the shank 111 such that the bore 118, which is formed during drilling, has a larger diameter than the diameter of the shank 111. The inserts are positioned such that the whole bore 118 will be cut when the drill revolves. The area which each of inserts 314 and 315 sweep from a cutting path which overlaps the cutting path of the other insert. In addition, the cutting path of the other insert 315 overlaps the turning axis of the drill. The shank 111 of the drill is adapted to receive the inserts 114 and 115 in conventional manner. The drill 110 has two pockets, one to receive each of the inserts 114 and 115. The inserts 114 and 115 are inset into the pockets and are clamped therein by known clamping systems such as screws, lock pins or clamps. Thus, the inserts 114 and 115 may have centre holes 119 (as shown) or be completely solid.

Referring to FIG. 4, each of the inserts 414 has octagonal side faces. The insert 414 is attached to the drill shank by means of a screw, lock pin or clamp 419 of conventional type, although other attachment means are possible. The insert 414 shown in FIG. 4 is the outer insert of the drill. It presents two cutting edges to the workpiece with approach angles $\alpha$ and $\beta$ to a notional line 422 perpendicular to the turning axis 423 of the drill. In FIG. 4, $\alpha = \beta$ but $\alpha - \beta$ may vary by up to 8° to balance turning forces between the radially outer cutting edge 420 and the radially inner cutting edge 421. Similar or different approach angles may also be used with the radially inner insert 115 of FIG. 2 again depending on the balance of the turning forces both between the radially inner and outer cutting edges and between the radially inner and outer inserts.

As the insert 414 has octagonal side faces there are three further pairs of cutting edges 424, 425; 426, 427; and 428,429. The geometry of the insert as shown in FIG. 4 is such that each of the pairs of the cutting edges is divided by angle $\gamma$ which is preferably 160° although it may vary from 135° to 170°. If the angle 135° is chosen then the octagon will be completely regular i.e. each corner angle will be exactly the same. Thus, it is essential that alternate angles are equal.

The corner 417 of the insert extends beyond the radius of the bore such that the shank of the drill clears the bore during drilling. This has already been described above in relation to FIG. 1. The important point to note with regard to the geometry is that corner 417 is also an obtuse angle i.e. is greater than 90°, usually about 95°. The obtuse angled corner 417 provides the insert with greater strength at this point than the prior art drills with trigonal inserts because in a trigonal insert the equivalent corner will be an acute angle substantially less than 90°.

In prior art drills, one of the problems, which is well recognised as indicated above, is the unequal forces which are applied to the drill when it turns in relation to the workpiece. The inserts themselves are symmetrical (although the ones shown in the drawings are not symmetrically along a notional line dividing each of the equal obtuse angles) and they are arranged such that the cutting edges of each insert lie along a diameter of the drill when viewed axially. The outer insert 114 of FIG. 1 will travel faster than the inner insert 115 over the face of the workpiece during one revolution because of the greater circumference of the area swept by it. Because of this, there can be an increased force on the outer insert. To overcome this, the insert 114 can be canted. In the drill shank 111, the pocket to receive the insert can be positioned such that each insert is received on the cant, i.e. $\alpha$ is greater than $\beta$ by up to 8°. Thus, the cutting edges on one side of the obtuse angle $\gamma$ is closer to the notional line perpendicular to the drill turning axis and offers less resistance to turning.

The insert 414 may have conventional chip breakers moulded therein. In a preferred embodiment a peripheral land 430 extends around the insert behind the cutting edge. Behind the peripheral land 430, a groove 431 extends around the insert. The groove may be a radial groove of uniform width. In FIG. 4 the groove has uniform width behind the cutting edges 420, 424, 426 and 428, whereas behind the cutting edges 421, 425, 427 and 429 the groove widens as it extends away from the obtuse angle $\gamma$. The angle of taper may be from 2° to 12° and is preferably 5°. By having a tapered groove behind the radially inner cutting edge 421, the forces between the outer cutting edge 420 and inner cutting edge 421 can be balanced. The chips produced by the cutting action of the insert from each cutting edge, each are uniform and the power consumption needed by the drill to operate is reduced by as much as 15° in consequence. Because the balance between the inner and outer cutting edges 420,421 are more even, this has a stabilizing effect on the whole drill.

The geometry of the insert provides a symmetrical insert. However, when the insert is positioned in the drill shank such that two cutting edges are presented to the workpiece as for example shown in FIGS. 1 and 2, the inserts are not arranged symmetrically and the inner and outer inserts 114 and 115 are mirror images of one another. This facilitates indexing of the inserts. Referring to FIG. 4, in the outer insert cutting edges 420,421 are presented to the workpiece. When these are worn, the screw, clamp or lock pin is released and the insert is turned through 180° and such that cutting edges 426,427 of the same insert are used. A similar 180° turning of the inner insert is also carried out. After the new cutting edges which are presented to the workpiece are worn, the outer insert is then positioned in the inner insert pocket, replacing the inner insert in the outer pocket after turning both through 90°. Thus, all four pairs of cutting edges of both the inner and outer insert are used alternately between the inner and outer insert position.

To receive the corner of the insert 117 as shown in FIG. 2 (i.e. the mirror image of the corner shown in FIG. 1) the flute of the drill is cut away beyond the centre line of the drill.

The drill shank is generally made of conventional materials such as steel. The inserts can be made of any material from which conventional inserts are made such as sintered carbides, i.e. tungsten carbides with a cobalt binder. They may be coated with TiN, TiC, $Al_2O_3$ or combination of various materials. Ceramic inserts may also be used if desired.

The drills of this type are generally of any suitable size. However, the advantageous sizes for a drill using a pair of inserts is about 16 mm to 75 mm.

Although a grooved chip breaker is described, the chip breaker may be of any known type. For example, the chip breaker may have double curved groove, i.e. the groove has a first radius of curvature extending from the cutting edge to the lowest point of the groove and a second radius of curvature extending from the lowest point of the groove to the surface of the hexagonal side face. The chip breaker may be a double groove, each groove has a radius of curvature which is the same of different. The groove is another alternative which may have a flat bottom and sloping sides.

A suitable form of chip breaker is a series of spaced apart dimples or depressions in the face of the insert. The depression may be uniformly spaced circular indentations which are positioned behind each of the cutting edges. The chip breaking dimples may be uniform or be such that they become larger as they extend away from each of the equal obtuse angles to form a taper on one or both sides of each of the obtuse angles.

In operation, either the workpiece 119 or the drill 110 rotates such that the inserts 114 and 115 produce a cutting action to form a bore. The turning action of the drill causes each insert to form a cutting path which overlaps both the other insert and the turning axis of the drill. Material is removed during cutting and passes out along the flutes 112 and 113. Cooling fluid is passed along the channel 116 and reaches the cutting area through holes 316 as shown in FIG. 3.

Although a drill with a pair of inserts has been described, it is within the scope of the present invention to provide a drill with more than two inserts according to the desired size of the drill. In this case, the cutting path of each insert overlaps the cutting path of the next insert such that the rotation of the drill will provide cutting action across the face. As the inserts are asymmetrical as far as the cutting action is concerned, when they have become worn, it is preferred to use the inserts in pairs according to the diameter of drill desired. Thus, for example, two pairs of inserts may be used in a drill either in line such that the cutting edges all lie along a diameter of the drill or with one pair of inserts lying at right angles to the other pair with four flutes to the drill instead of two. The essential feature of the drill is that the cutting action of the inner insert overlaps the turning axis of the drill, and each of the next radially outer inserts overlaps the next radially inner insert. Other combinations of pairs of inserts is also possible. Each pair of inserts may be of different sizes and geometry, if desired, although it is preferred that the inserts are identical within each pair to facilitate indexing and with most drills the pairs of inserts are preferably identical in geometry.

I claim:

1. A drilling tool having a shank and plurality of cutting inserts capable of forming a hole during drilling, the inserts having two parallel octagonal asymmetrical side faces and contiguous edge faces of equal length, the octagonal side faces having alternate equal obtuse angles and cutting edges formed at the junction of at least one of the side faces and each of the edge faces, the inserts being positioned along an axis perpendicular to the turning axis of the drill, at least one insert being either side of the turning axis and arranged such that they each have a different radial displacement from the turning axis of the drill, the inner insert having a cutting path which overlaps the turning axis of the drill and each next radially outer insert having a cutting path which overlaps the cutting path of the next inner insert, the cutting path of each insert being formed by the cutting edges either side of one of the equal obtuse angles of the insert, and the outermost insert having a cutting corner which extends beyond the shank of the drill such that the shank of the drill clears the hole during drilling, the cutting corner also having an obtuse angle.

2. A drill as claimed in claim 1 having a pair of octagonal inserts arranged with their cutting edges along a diameter of the drill.

3. A drill as claimed in claims 1 or 2 wherein the equal obtuse angle of the octagonal insert is 160°±30'.

4. A drill as claimed in claims 1 or 2 having a chip breaker extending around the insert behind a peripheral land adjacent each cutting edge.

5. A drill as claimed in claims 1 or 2 having a chip breaker behind each cutting edge, the chip breaker behind each alternate cutting edge becoming wider as it extends away from the equal obtuse angle of the insert.

* * * * *